(12) United States Patent
Antonyuk et al.

(10) Patent No.: US 9,207,858 B2
(45) Date of Patent: Dec. 8, 2015

(54) METHOD AND APPARATUS FOR DRAWING AND ERASING CALLIGRAPHIC INK OBJECTS ON A DISPLAY SURFACE

(75) Inventors: Viktor Antonyuk, Calgary (CA); Joseph Michael Goethals, Calgary (CA); Shymmon Banerjee, Calgary (CA)

(73) Assignee: SMART Technologies ULC, Calgary (CA)

( * ) Notice: Subject to any disclaimer, the term of this patent is extended or adjusted under 35 U.S.C. 154(b) by 1169 days.

(21) Appl. No.: 12/904,599

(22) Filed: Oct. 14, 2010

(65) Prior Publication Data

US 2011/0199297 A1      Aug. 18, 2011

Related U.S. Application Data

(60) Provisional application No. 61/252,064, filed on Oct. 15, 2009.

(51) Int. Cl.
- *G06T 11/20* (2006.01)
- *G06F 3/0488* (2013.01)
- *G06K 9/00* (2006.01)
- *G06K 9/22* (2006.01)

(52) U.S. Cl.
CPC ........ *G06F 3/04883* (2013.01); *G06K 9/00416* (2013.01); *G06K 9/222* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 4,620,287 A * | 10/1986 | Yam | 345/442 |
| 5,434,959 A * | 7/1995 | Von Ehr et al. | 345/441 |
| 5,448,263 A | 9/1995 | Martin | |
| 6,055,332 A * | 4/2000 | Aitani et al. | 382/186 |
| 6,141,000 A | 10/2000 | Martin | |
| 6,157,750 A * | 12/2000 | Choi et al. | 382/301 |
| 6,326,954 B1 | 12/2001 | Van Ieperen | |
| 6,337,681 B1 | 1/2002 | Martin | |
| 6,631,200 B1 * | 10/2003 | Savoray et al. | 382/119 |
| 6,747,636 B2 | 6/2004 | Martin | |
| 6,803,906 B1 | 10/2004 | Morrison et al. | |
| 6,909,430 B2 * | 6/2005 | Dresevic et al. | 345/443 |
| 6,952,803 B1 | 10/2005 | Bloomberg et al. | |
| 7,039,234 B2 * | 5/2006 | Geidl et al. | 382/187 |
| 7,224,847 B2 | 5/2007 | Zhang et al. | |
| 7,232,986 B2 | 6/2007 | Worthington et al. | |
| 7,236,162 B2 | 6/2007 | Morrison et al. | |

(Continued)

OTHER PUBLICATIONS

Richard J Kinch: MetaFog: Converting Metafont Shapes to Contours TUGboat, vol. 16, No. 3—Proceedings of the 1995 Annual Meeting, Jan. 1, 1995, pp. 233-243.

(Continued)

*Primary Examiner* — Aaron M Richer
*Assistant Examiner* — Anh-Tuan V Nguyen
(74) *Attorney, Agent, or Firm* — Katten Muchin Rosenman LLP

(57) ABSTRACT

A method of generating a calligraphic ink object, comprising sampling contact coordinates generated by a coordinate input device during writing thereon using a pointer to generate an ink trajectory generally representing the writing; generating an ink envelope, the ink envelope comprising line segments joining pointer instances at the sampled contact coordinates; generating a smoothed ink envelope at least by fitting curves to points on the ink envelope; and drawing the smoothed ink envelope on a display thereby to generate the calligraphic ink object.

34 Claims, 10 Drawing Sheets

(56) References Cited

U.S. PATENT DOCUMENTS

| | | |
|---|---|---|
| 7,274,356 B2 | 9/2007 | Ung et al. |
| 7,499,055 B2* | 3/2009 | Lin et al. ............... 345/467 |
| 2003/0024748 A1* | 2/2003 | Dresevic et al. ......... 178/18.01 |
| 2003/0025681 A1* | 2/2003 | Hara ..................... 345/178 |
| 2004/0028274 A1 | 2/2004 | Kawakami |
| 2004/0041811 A1* | 3/2004 | Lin et al. ............... 345/467 |
| 2004/0189666 A1* | 9/2004 | Frisken et al. ........... 345/611 |
| 2004/0196288 A1* | 10/2004 | Han ..................... 345/467 |
| 2004/0233197 A1 | 11/2004 | Liu et al. |
| 2006/0274057 A1 | 12/2006 | Van Ness et al. |
| 2007/0040813 A1* | 2/2007 | Kushler et al. ........... 345/173 |
| 2009/0245654 A1 | 10/2009 | Xing et al. |

OTHER PUBLICATIONS

Anonymous, "Metafont—Wikipedia, the free encyclopedia", Sep. 5, 2009, XP055086186, Retrieved from the Internet: <URL:http://en.wikipedia.org/w/index.php?title=Metafont&oldid=312004506> [retrieved on Oct. 31, 2013].

Extended European Search Report for European Patent Application No. EP 10 82 2947, with a mailing date of Nov. 13, 2013.

L. Belenkaia et al., "Creation, Presentation, Capture, and Replay of Freehand Writing in e-Lecture Scenarios" 2004 Paper presented at the ED-MEDIA World Conference on Educational Multimedia, Hypermedia & Telecommunications, accessed from the internet on Nov. 10, 2010 at: <http://citeseerx.ist.psu.edulviewdoc/summary?doi=10.1.1.93.5398>.

Maria Teresa Infante Velazquez, "Metrics and Neatening of Handwritten Characters" Jun. 29, 2010 Master of Computer Science Thesis at the University of Western Ontario, accessed from the internet on Nov. 10, 2010 at: <http://www.csd.uwo.ca/-watt/home/students/theses/MTInfanteVelazquez2010-msc.pdf>.

Paul Yao, "Add Support for Digital Ink to Your Windows Applications" MSDN Magazine 2004 accessed from the internet on Nov. 10, 2010 at: <httn: 1/l11sdn.microsoft.com/en-uslmagazinelcc 163 869.asnx>.

Microsoft News Center, "Digital Ink, Breakthrough Technology in Tablet PC, Brings the Power of the Pen to the Desktop" (Microsofl News Center) Oct. 29, 2002 accesed from the internet on Nov. 15, 2010 at: <http://www.microsofi.com/presspass/features/2002/oct02/I 0-29tabletinking.mspx>.

Transmittal; International Search Report; and Written Opinion of the International Searching Authority for International Application No. PCT/CA2010001589.

* cited by examiner

Fig. 8E
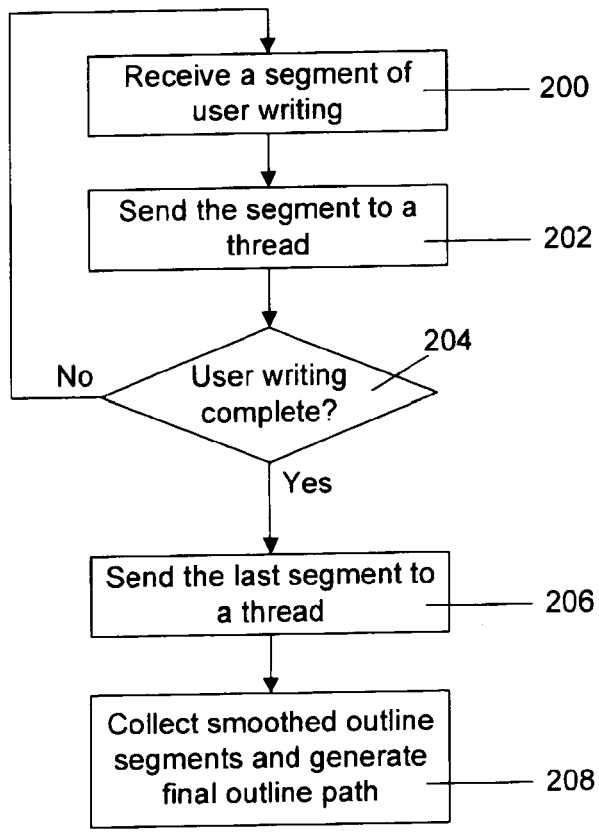
FIG. 9A
Fig. 9B
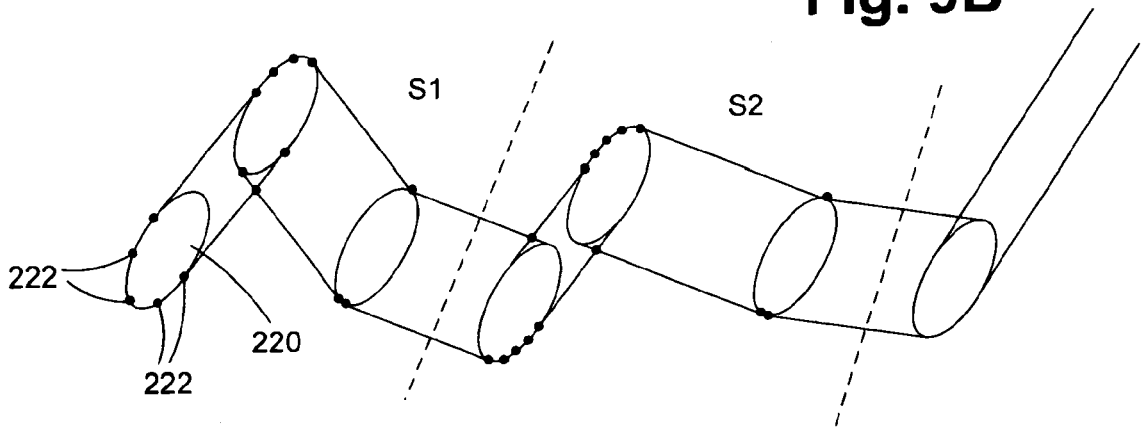

METHOD AND APPARATUS FOR DRAWING AND ERASING CALLIGRAPHIC INK OBJECTS ON A DISPLAY SURFACE

This application claims priority to U.S. Patent Appln. No. 61/252,064, filed Oct. 15, 2009, the contents of which are incorporated herein by reference.

FIELD OF THE INVENTION

The present invention relates to a method and apparatus for drawing and erasing calligraphic ink objects on a display surface.

BACKGROUND OF THE INVENTION

Interactive input systems that allow users to inject input (e.g. digital ink, mouse events etc.) into an application program using an active pointer (e.g., a pointer that emits light, sound or other signal), a passive pointer (e.g., a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the entire contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

A number of applications that generate calligraphic ink from a user's handwritten input (i.e. ordinary ink) have been considered. For example, these applications include Microsoft Tablet PC applications, and the calligraphy tool implemented in the Inkscape Open Source vector graphics editor. Compared to ordinary ink, which is represented as a pixel-based image object, calligraphic ink is represented as a vectorized image. As a result, calligraphy ink has a smoother appearance than ordinary ink, and can be arbitrarily zoomed without showing jagged or zig-zag lines (i.e. stair-stepping) that are usually seen at the edges of a zoomed ordinary ink object. Unfortunately existing calligraphic ink generating applications still exhibit disadvantages. In particular, existing calligraphic ink generating applications are slow, do not present the outlines of calligraphic ink objects with the desired degree of smoothness and do not readily permit portions of calligraphic ink objects to be erased.

Methods of erasing ink objects have been considered. For example, U.S. Pat. No. 6,326,954 to Van Ieperen et al. entitled "Method For Erasing On An Electronic Writeboard", assigned to SMART Technologies ULC of Calgary, Alberta, Canada, assignee of the subject application, teaches a method of erasing at least a portion of an ink object displayed on an electronic writeboard. However, when this method is applied to calligraphic ink objects, the degree of smoothness of the unerased portion of the calligraphic ink object typically does not meet the desired standard.

Therefore, there is a need to provide a novel method of generating and erasing calligraphic ink objects on a display surface.

SUMMARY OF THE INVENTION

Accordingly, in one aspect there is provided a method of generating a calligraphic ink object, comprising sampling contact coordinates generated by a coordinate input device during writing thereon using a pointer to generate an ink trajectory generally representing the writing; generating an ink envelope, said ink envelope comprising line segments joining pointer instances at said sampled contact coordinates; generating a smoothed ink envelope at least by fitting curves to points on said ink envelope; and drawing the smoothed ink envelope on a display thereby to generate the calligraphic ink object.

In one embodiment, the sampling contact coordinates further comprises processing the sampled contact coordinates to reduce the number of sampled contact coordinates used to generate the ink trajectory. In particular, selected sampled contact coordinates that are co-linear with other sampled contact coordinates are discarded.

In one embodiment, the ink envelope generating is performed upon completion of writing, such as for example when a pointer up event occurs. The ink envelope generally completely surrounds the ink trajectory. The ink envelope generating comprises surrounding each sampled contact coordinate along the generated ink trajectory with a pointer instance and for each consecutive pair of sampled coordinates, generating line segments on opposite sides of a line segment joining the sampled contact coordinates of the pair that extend between the pointer instances surrounding the sampled contact coordinates of the pair. The generated line segments extending between the pointer instances surrounding the sampled contact coordinates of each pair may be substantially tangential to the peripheries of the pointer instances.

In one embodiment, generating the smoothed ink envelope comprises fitting Bezier curves to points on the ink envelope.

In another embodiment, the ink trajectory comprises ink trajectory segments. An ink envelope segment is generated for each ink trajectory segment and the ink envelopes segments are combined to form the ink envelope.

In one embodiment, the drawing comprises drawing the smoothed ink envelope as a vectorized image. Prior to the drawing, the smoothed ink envelope may be colored or shaded.

According to another aspect there is provided a method of generating a calligraphic ink object comprising generating an ink trajectory representing writing input on a coordinate input device using an object, the ink trajectory comprising a subset of contact coordinates generated by the coordinate input device; generating an ink envelope surrounding the ink trajectory, the ink envelope being represented by curved and straight line segments; and drawing the ink envelope on a display thereby to generate the calligraphic ink object.

In one embodiment, the curved line segments are Bezier curves and the ink envelope resembles the boundary of the path of a geometric pointer tip following the ink trajectory.

According to yet another aspect there is provide an apparatus comprising at least one processor; and memory storing a calligraphic ink object generating routine, the calligraphic ink object generating routine, when executed by the at least one processor, causing the apparatus to: sample contact coordinates generated by a coordinate input device during writing thereon using a pointer to generate an ink trajectory generally representing the writing; generate an ink envelope, said ink envelope comprising line segments joining pointer instances at said sampled contact coordinates; generate a smoothed ink envelope at least by fitting curves to points on said ink envelope; and draw the smoothed ink envelope on a display thereby to generate the calligraphic ink object.

According to yet another aspect there is provided an apparatus comprising at least one processor; and memory storing a calligraphic ink object generating routine, the calligraphic ink object generating routine, when executed by the at least one processor, causing the apparatus to: generate an ink trajectory representing writing input on a coordinate input device using an object, the ink trajectory comprising a subset of contact coordinates generated by the coordinate input device; generate an ink envelope surrounding the ink trajectory, the ink envelope being represented by curved and straight line segments; and draw the ink envelope on a display thereby to generate the calligraphic ink object.

According to yet another aspect there is provided a computer readable medium embodying computer program code, which when executed by at least one processor, causes an apparatus to sample contact coordinates generated by a coordinate input device during writing thereon using a pointer to generate an ink trajectory generally representing the writing; generate an ink envelope, said ink envelope comprising line segments joining pointer instances at said sampled contact coordinates; generate a smoothed ink envelope at least by fitting curves to points on said ink envelope; and draw the smoothed ink envelope on a display thereby to generate the calligraphic ink object.

According to yet another aspect there is provided a computer readable medium embodying computer program code, which when executed by at least one processor, causes an apparatus to: generate an ink trajectory representing writing input on a coordinate input device using an object, the ink trajectory comprising a subset of contact coordinates generated by the coordinate input device; generate an ink envelope surrounding the ink trajectory, the ink envelope being represented by curved and straight line segments; and draw the ink envelope on a display thereby to generate the calligraphic ink object.

According to yet another aspect there is provided a method of erasing at least a portion of a calligraphic ink object delineated by an eraser trace intersecting said calligraphic ink object, said method comprising calculating intersection points between said calligraphic ink object and said eraser trace; generating additional points along line segments that extend between the intersection points on opposite sides of the eraser trace; fitting curves to the intersection points and the additional points; modifying the outline of said calligraphic ink object using said curves; and deleting the portion of said calligraphic ink object between said curves.

According to yet another aspect there is provided an apparatus comprising at least one processor; and memory storing a calligraphic ink object erasing routine, the calligraphic ink object erasing routine, when executed by the at least one processor, causing the apparatus to: calculate intersection points between said calligraphic ink object and said eraser trace; generate additional points along line segments that extend between the intersection points on opposite sides of the eraser trace; fit curves to the intersection points and the additional points; modify the outline of said calligraphic ink object using said curves; and delete the portion of said calligraphic ink object between said curves.

According to still yet another aspect there is provided a computer readable medium embodying computer program code, which when executed by at least one processor, causes an apparatus to calculate intersection points between said calligraphic ink object and said eraser trace; generate additional points along line segments that extend between the intersection points on opposite sides of the eraser trace; fit curves to the intersection points and the additional points; modify the outline of said calligraphic ink object using said curves; and delete the portion of said calligraphic ink object between said curves.

BRIEF DESCRIPTION OF THE DRAWINGS

Embodiments will now be described more fully with reference to the accompany drawings in which:

FIG. 8E shows an exemplary calligraphic ink object;

FIG. 9A is a flowchart showing alternative steps performed during calligraphic ink object generating;

FIG. 9B shows two exemplary segments of an ink object;

DETAILED DESCRIPTION OF THE PREFERRED EMBODIMENT

Figure 1:
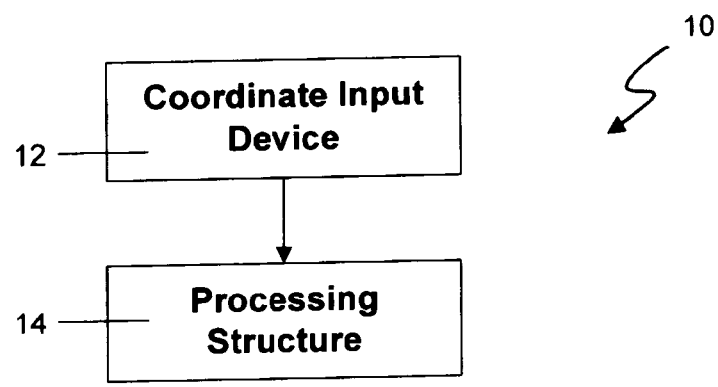
FIG. 1 is a simplified block diagram of an interactive input system.

Turning now to FIG. 1, a block diagram of an interactive input system is shown and is generally identified by reference numeral 10. Interactive input system 10 comprises a coordinate input device 12 such as for example a touch panel, interactive surface or interactive whiteboard on which pointer contacts can be made. The coordinate input device 12 communicates with processing structure 14 executing one or more application programs. Image data generated by the processing structure 14 is displayed on a display surface of the coordinate input device 12 allowing a user to interact with the displayed image via pointer contacts on the coordinate input device 12. The processing structure 14 interprets pointer contacts as input to the running application program and updates the image data accordingly so that the image displayed on the display surface of the coordinate input device 12 reflects the pointer activity. In this manner, the coordinate input device 12 and processing structure 14 allow pointer interactions with the coordinate input device 12 to be recorded as handwriting or drawing or used to control execution of the running application program. The coordinate input device 12 of the interactive input system 10 may be separate from the processing structure 14, or may be combined with the processing structure 14 to form an integral compact unit as in the case of personal computers (PCs), tablet PCs, laptop PCs, personal digital assistants (PDAs), cellular telephones or other suitable devices.

Figure 2:
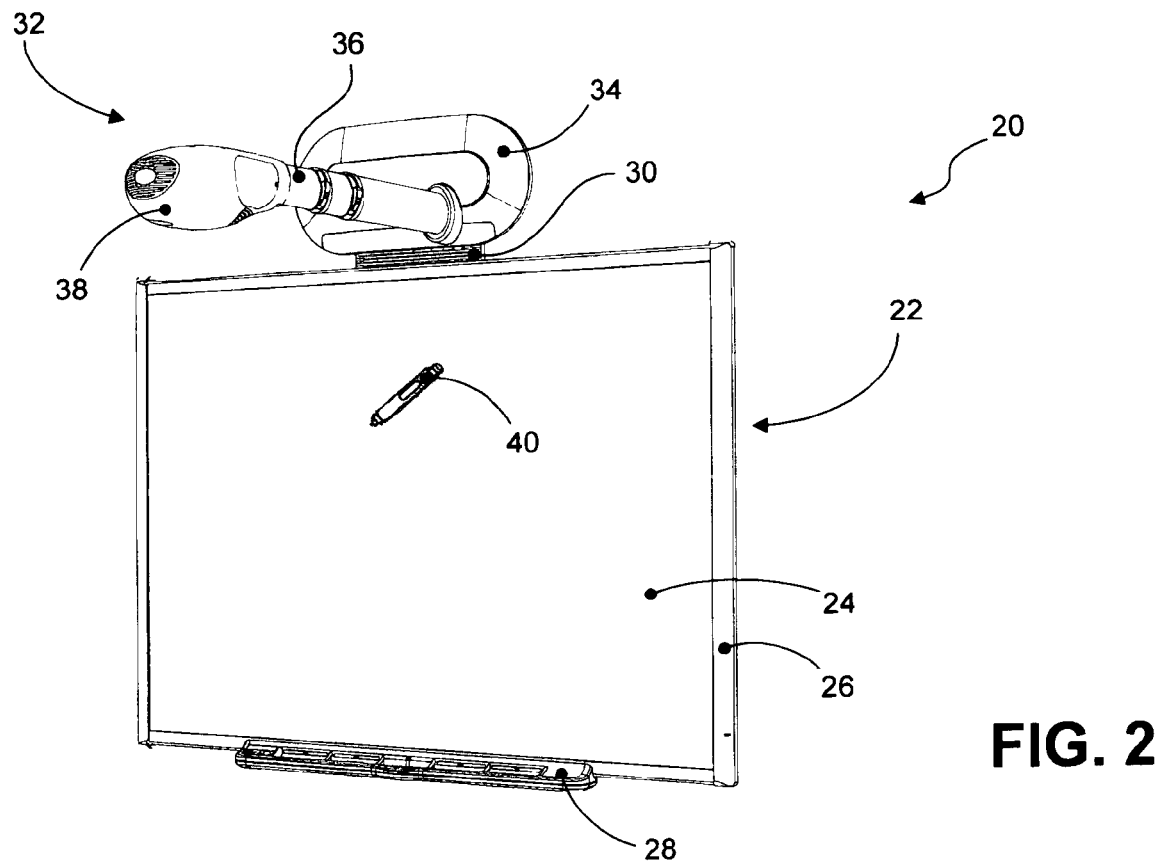
FIG. 2 is a perspective view of a portion of the interactive input system of FIG. 1.

FIG. 2 illustrates an exemplary coordinate input device 12 in the form of an interactive whiteboard (IWB) 20. In this embodiment, the IWB 20 is a 600i series interactive whiteboard manufactured by SMART Technologies ULC, of Calgary, Alberta, Canada, assignee of the subject application. The IWB 20 comprises a large, analog resistive touch screen 22 having a touch surface 24, which also acts as a display surface on which computer generated images are presented. The touch surface 24 is surrounded by a bezel 26. A tool tray 28 is affixed to the bezel 26 adjacent the bottom edge of the touch surface 24 and accommodates one or more pen tools that are used to interact with the touch surface 24. The touch screen 22 is mounted on a wall or other suitable support surface via a mounting bracket 30. A boom assembly 32 is also mounted on the wall above the touch screen 22 via the mounting bracket 30. The boom assembly 32 comprises a speaker housing 34 accommodating a plurality of speakers (not shown), a generally horizontal boom 36 extending outwardly from the speaker housing 34 and a projector 38 adjacent the distal end of the boom 36. The projector 38 is aimed back towards the touch screen 22 so that the image projected by the projector 38 is presented on the touch surface 24.

When the user uses a pen tool 40 or a finger to contact the touch surface 24, the touch screen 22 detects the contact and transmits contact information to the processing structure 14 (see FIG. 1). The processing structure 14 obtains or calculates the pointer coordinates at the contact location(s) on the touch surface 24 using the contact information transmitted from the touch screen 22. Depending on the operating mode of the IWB 20, the pen tool contact coordinates are interpreted as a digital ink drawing object, a digital ink erasing object, or a command (mouse) event.

The processing structure 14 in this embodiment is a general purpose computing device in the form of a personal computer or other suitable processing device. The computer comprises for example, a processing unit, system memory (volatile and/or non-volatile memory), other non-removable or removable memory (a hard disk drive, RAM, ROM, EEPROM, CDROM, DVD, flash memory etc.) and a system bus coupling the various computer components to the processing unit. It will be understood that the computer may also include a network connection to access shared or remote drives, one or more networked computers, or other networked devices over wired and/or wireless communication links using an appropriate communications format (e.g. Ethernet, WiFi, BlueTooth etc.)

The processing structure 14 runs a host software application such as SMART Notebook™ offered by SMART Technologies ULC of Calgary, Alberta, Canada. As is known, during execution, the SMART Notebook™ application provides a graphical user interface comprising a canvas page or palette, that is presented on the touch surface 24, and on which freeform or handwritten ink objects together with other computer generated objects can be input and manipulated via pointer interaction with the touch surface 24.

Figure 3A:
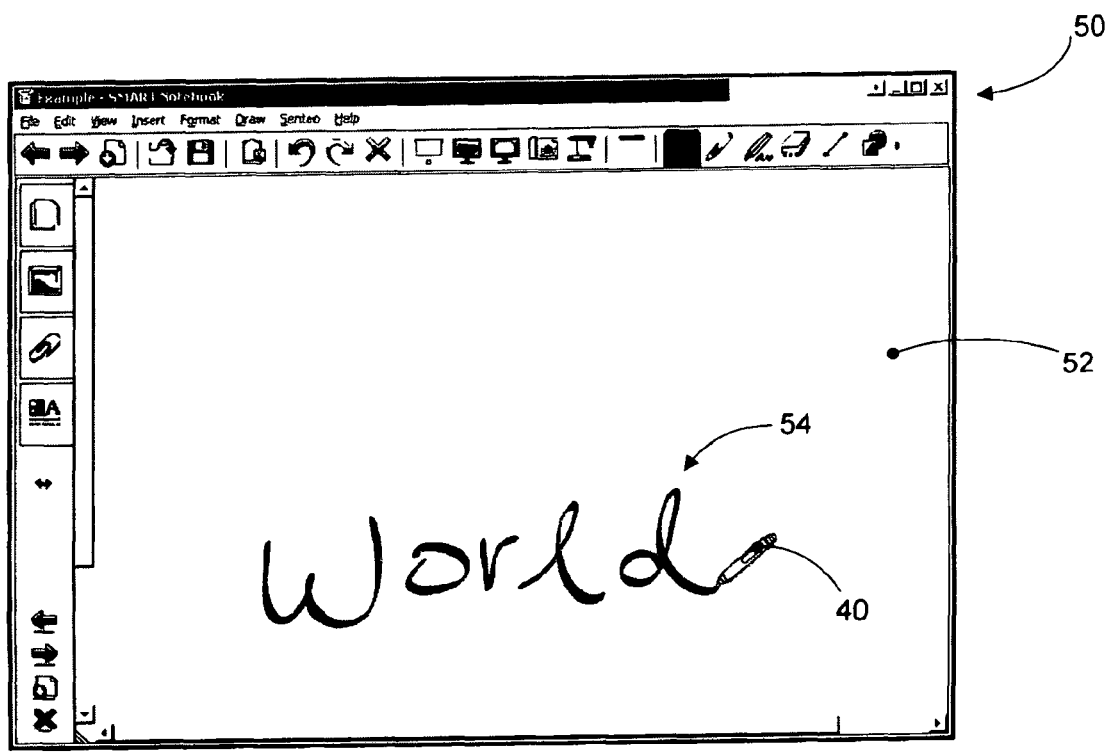
FIGS. 3A to 3C illustrate a graphical user interface presented on an interactive whiteboard forming part of the interactive input system of FIG. 1.
Figure 3B:
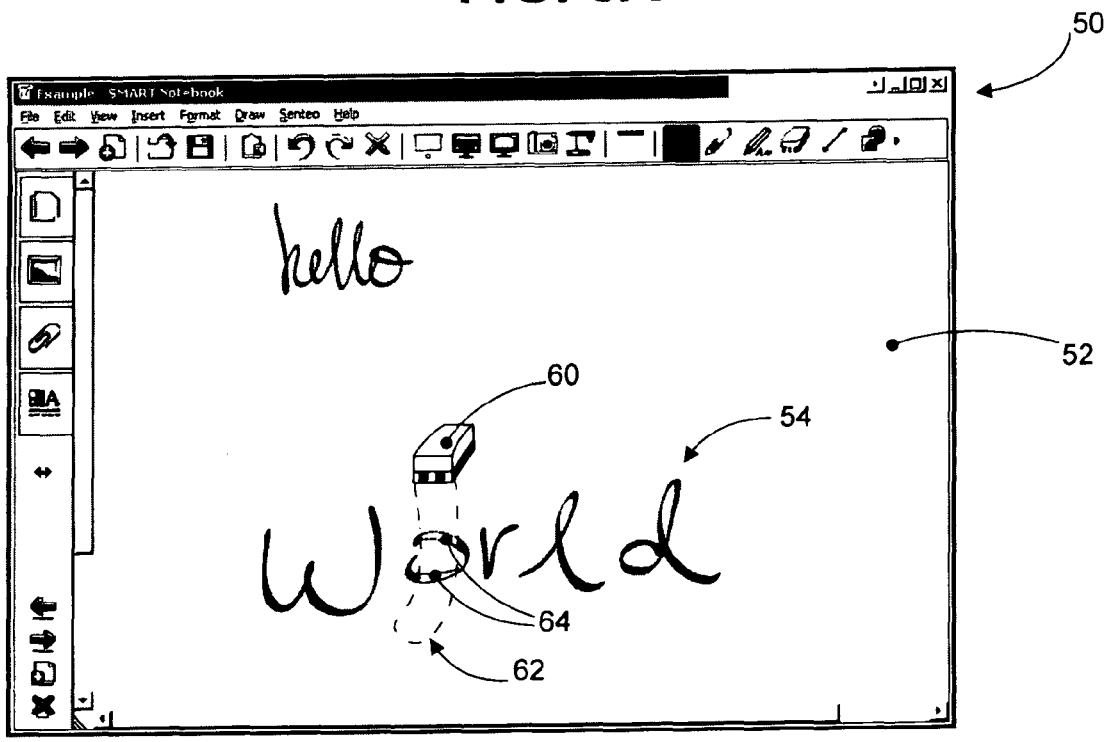
Figure 3C:
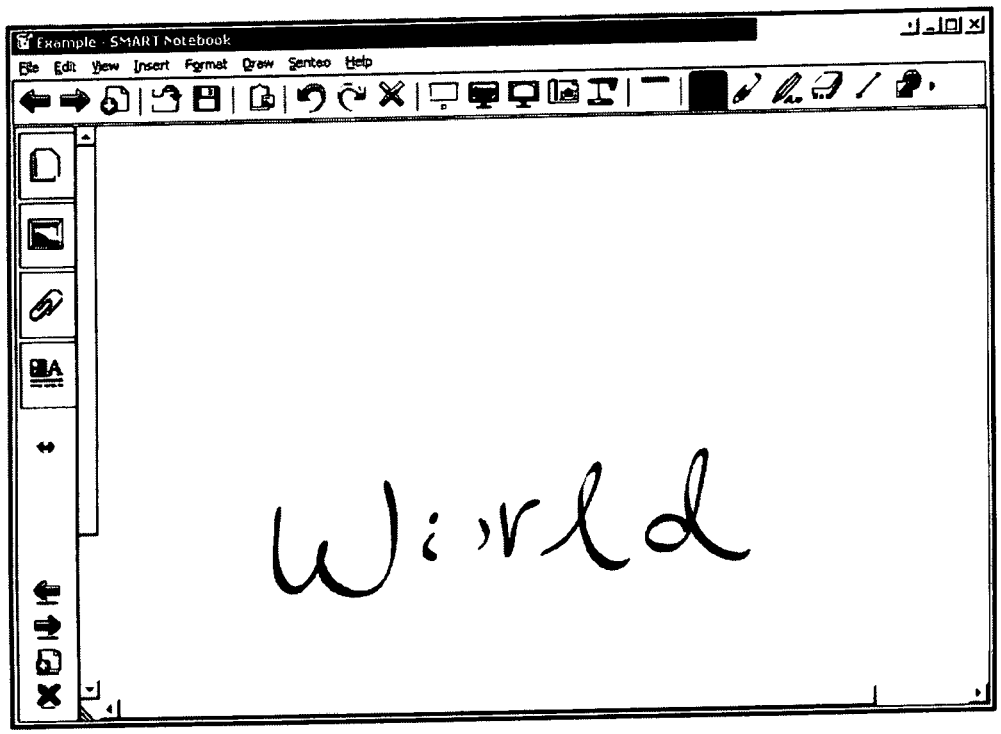

FIGS. 3A to 3C show the graphical user interface 50 presented on the touch surface 24 as a SMART Notebook™ application window. As shown in FIG. 3A, when a user writes on the canvas page 52 inside the SMART Notebook™ application window 50 using the pen tool 40, as the pen tool 40 is moved along the touch surface 24, the touch screen 22 transmits contact information to the processing structure 14. The processing structure 14 in turn uses the contact information to determine the pen tool contact coordinates and interprets the pen tool coordinates as input digital ink. The input digital ink is used by the processing structure 14 to create a calligraphic ink object 54 representing the user's writing on the touch surface 24. The processing structure 14 also updates the image data conveyed to the projector 38 so that the calligraphic ink object 54 is presented on the touch surface 24. The image data is updated substantially immediately in "real time" by the processing structure 14 so that the projected image includes the user's writing substantially as soon as it is input.

As shown in FIG. 3B, when an eraser tool 60 is dragged along a path or trace 62 across the calligraphic ink object 54 displayed on the canvas page 52, the portion 64 of the ink calligraphic ink object 54 that intersects the trace 62 is erased. The calligraphic ink object 54 after the erasing operation is shown in FIG. 3C.

Figure 4:
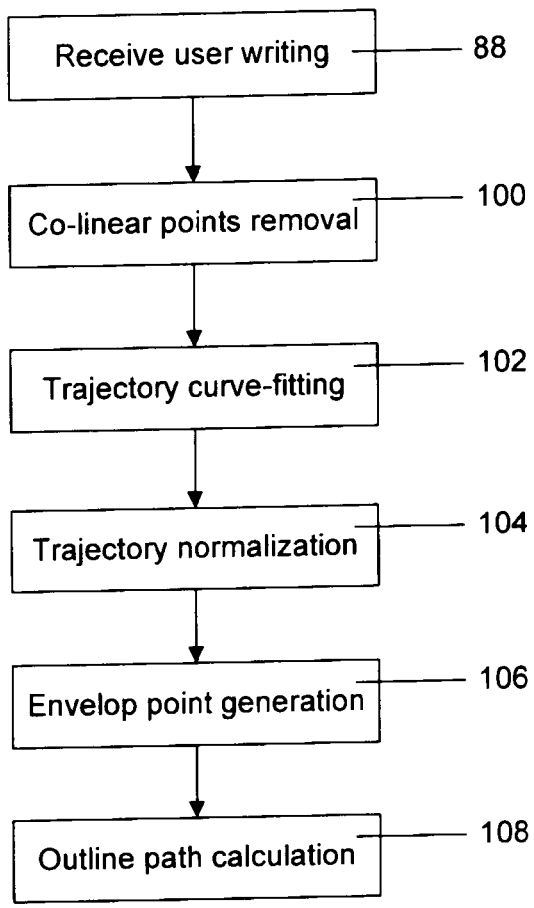
FIG. 4 is a flowchart showing the steps performed during calligraphic ink object generating.

FIG. 4 shows the general steps performed by the processing structure 14 during generation of a calligraphic ink object. At step 88, the processing structure 14 receives contact information from the touch screen 22 in response to a user writing on the touch surface 24 using a pen tool 40 or finger. In this embodiment, the contact information is a series of sampled coordinates representing contact points on the touch surface 24.

The processing structure 14 generates the calligraphic ink object from the sampled contact points based on the brush type the user is using. In this embodiment, the brush type is a virtual pointer tip selected by the user from a set of predefined virtual pointer tip shapes, including circles, ellipses, polygons, etc., together with a user selected pointer tip size. In this case, the sampled contact points obtained at step 88 form the trajectory of the ink object, where each sampled contact point represents the centroid of the corresponding instance of the user selected brush type.

For ease of discussion, the calligraphic ink object generating method employed by the processing structure 14 will be described assuming that an elliptical brush has been selected by the user. At step 100, the processing structure 14 checks the sampled contact points of the ink trajectory, and removes co-linear contact points. For example, if $P_1, P_2, \ldots, P_n$ represent the sampled contact points of the ink trajectory, during the co-linear contact point removal process, the processing structure 14 calculates the slope of a line segment connecting the contact points $P_i$ and $P_{i+1}$ according to:

$$L_i = (y_{i+1} - y_i)/(x_{i+1} - x_i)$$

where i=1,2, ..., i−2.

Then, the processing structure 14 calculates the slope of a line segment connecting the contact points $P_{i+1}$ and $P_{i+2}$ according to:

$$L_{i+1} = (y_{i+2} - y_{i+1})/(x_{i+2} - x_{i+1})$$

Figure 5:
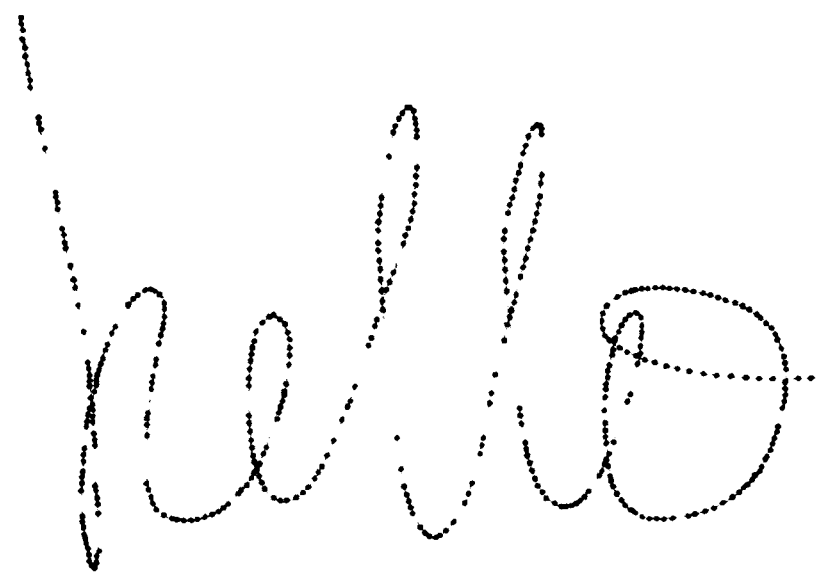
FIG. 5 shows an exemplary ink trajectory after removing co-linear points.

If the calculated slopes are not equal i.e. $L_i \neq L_{i+1}$, the processing structure 14 continues to compare the slope of a line segment connecting contact points $P_{i+1}$ and $P_{i+2}$ with that of a line segment connecting contact points $P_{i+2}$ and $P_{i+3}$. If the calculated slopes are equal i.e. $L_i = L_{i+1}$, the contact points $P_i$, $P_{i+1}$ and $P_{i+2}$ are co-linear points and the contact point $P_{i+1}$ is removed. In this case, the processing structure 14 compares the slope of the line segment connecting contact points $P_i$ and $P_{i+2}$ with that of the line segment connecting contact points $P_{i+2}$ and $P_{i+3}$. The process continues in this manner until all sampled contact points are checked. FIG. 5 shows an example of the ink trajectory after removing co-linear contact points.

Turning back to FIG. 4, at step 102 following removal of co-linear contact points, the ink trajectory is smoothed by piecewise curve-fitting. One of a number of known piecewise curve fitting techniques may be used. Generally, the resulting ink trajectory is a set of curve-fitting functions $f_k(A)$, where k=1, 2, ..., and A is a set of parameters determined by the sampled contact points. In this embodiment, the processing structure 14 uses the piecewise curve-fitting technique described in the publication entitled "An Algorithm for Automatically Fitting Digitized Curves" authored by Philip J. Schneider, Graphics Gems, pages 612-626, Academic Press Professional, Inc. (1990), the entire content of which is incorporated herein by reference. The resulting ink trajectory is a set of connected Bezier curves, where each Bezier curve is a Bezier function determined by four control points calculated from the sampled contact points.

Figure 6:
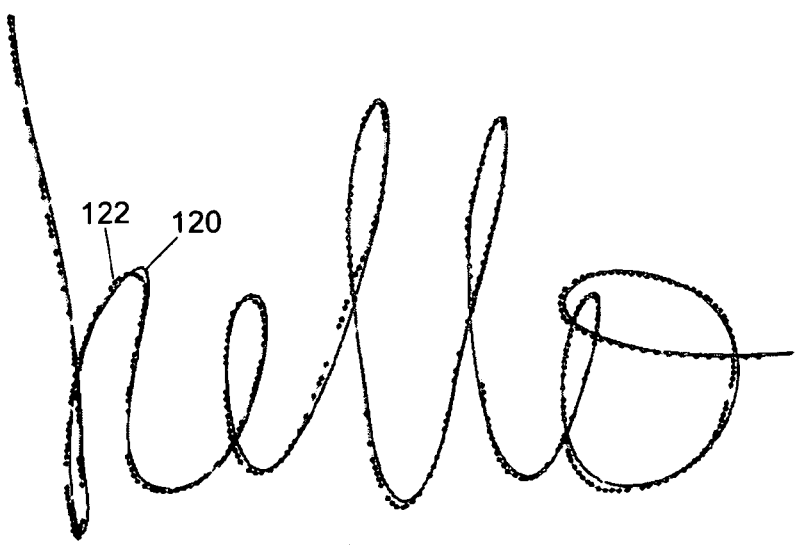
FIG. 6 shows a curve-fitted and normalized ink trajectory overlaid on the ink trajectory of FIG. 5 before curve-fitting.

At step 104, each Bezier curve is sampled with respect to a predefined point distance. The obtained sampled contact points, which form a normalized ink trajectory, are indexed in accordance with a predefined order (e.g., the order of writing). FIG. 6 shows the curve-fitted and normalized ink trajectory 120 (the curve without dots) overlaid on the ink trajectory before curve-fitting 122 (the curve with dots).

Figure 7:
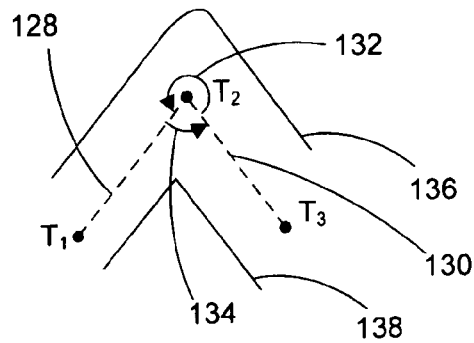
FIG. 7 illustrates an outer envelope and an inner envelope surrounding points on the normalized ink trajectory.

Turning back to FIG. 4, at step 106 following curve-fitting, the shape of the selected virtual pointer tip is applied to each sampled contact point of the normalized ink trajectory to form an ink envelope. For any three successive sampled contact points of the normalized ink trajectory, an outer envelope and an inner envelope are defined. Referring to FIG. 7, three successive sampled contact points $T_1$, $T_2$ and $T_3$ are shown. The line segment 128 between contact points $T_1$ and $T_2$, and the line segment 130 between contact points $T_2$ and $T_3$ form a first angle 132 greater than $\pi$, and a second angle 134 smaller than $\pi$. The envelope 136 that is within the range of the first angle 132 is defined as the outer envelope, and the envelope 138 that is within the range of the second angle 134 is defined as the inner envelope.

Figure 8A:
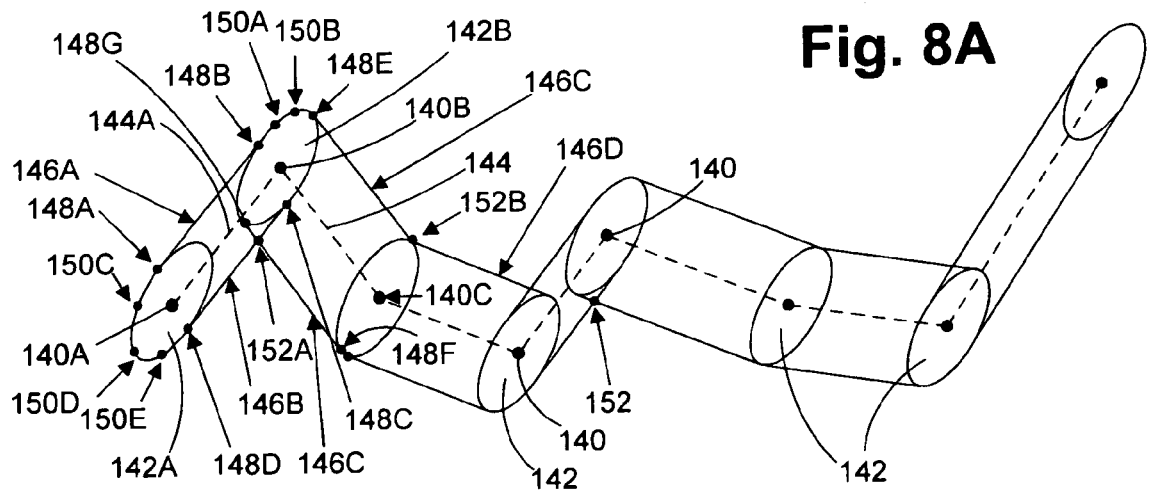
FIGS. 8A to 8C show an example of raw envelope point generating and curve fitting.
Figure 8B:
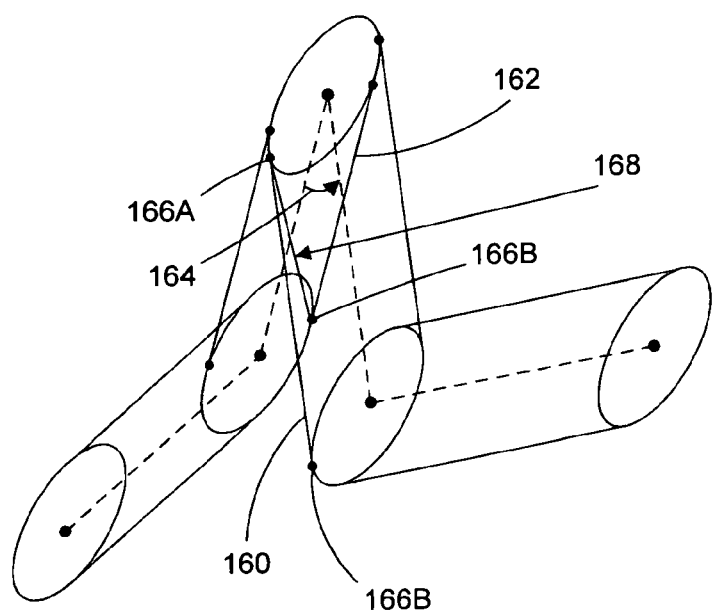

FIGS. 8A and 8B illustrate generation of the raw points of the ink envelope. As mentioned above, in this example the pointer tip has an elliptical shape. In FIG. 8A, reference numerals 140, 140A, 140B and 140C represent the sampled contact points of the normalized ink trajectory. A pointer tip instance 142, 142A and 142B is applied to and centered at each sampled point contact 140. Then, the processing structure 14 calculates two line segments 146 for each two adjacent sampled contact points 140, which are tangential to the pointer tip instances at tangent points 148. In the cases where a fixed-size pointer tip is used, the line segments 146 are also parallel to the line segment 144 between the two adjacent sampled contact points 140. In other cases where the pointer tip may vary in size, shape, and/or angle, the line segments 146 may not be parallel to the line segment 144. For the two adjacent sampled contact points 140A and 140B, the processing structure 14 calculates an upper line segment 146A that is parallel to the line segment 144A between the adjacent sampled contact points 140A and 140B, and is tangential to the pointer tip instances 142A and 142B, respectively, at tangent points 148A and 148B. The processing structure 14 also calculates a lower line segment 146B that is parallel to the line segment 144A between the adjacent sampled contact points 140A and 140B, and is tangential to the pointer tip instances 142A and 142B, respectively, at tangent points 148C and 148D. The tangent points, e.g., points 148A, 148B, 148C and 148D, are recorded as raw envelope points.

For any three successive sampled contact points of the ink trajectory, the corresponding outer envelope comprises a portion of the pointer tip instance centered at the middle sampled contact point. This portion of the pointer tip instance is then sampled with respect to a predefined point distance, and the obtained sampled contact points are also recorded as raw envelope points. For example, for the three successive contact points 140A, 140B and 140C, the raw outer envelope points comprise the tangent points 148A and 148B, the points 150A and 150B of the pointer tip instance 142B, the tangent point 148E, and the intersection point 152B of the tangential line segments 146C and 146D.

To determine the raw inner envelope points for any three successive sampled contact points of the normalized ink trajectory, two cases need to be considered. The first case is illustrated in FIG. 8A, where the tangential line segment 146B in the inner envelope area intersects with the tangential line segment 146C in the inner envelope area. In this case, the intersection point 152A, as well as the tangent points 148D and 148F are recorded as raw inner envelope points. Note that the tangent points 148C and 148G are dropped.

The second case is illustrated in FIG. 8B, where at least a portion of the tangential line segments 160 and 162, respectively, is within the range of the first angle 164, which is smaller than $\pi$. In this case, although the line segments 160 and 162 form the raw inner envelope, as illustrated in FIG. 8B, the line segments 160 and 162 do not intersect. In this case, the tangent point 166A, which is the end point of the tangential line segment 160 that is closest to the tangent line segment 162, and the tangential point 166B, which is the end point of the tangent line segment 162 that is closest to the tangent line segment 160, are defined as break-points.

Turning back to FIG. 8A, for each end point of the normalized ink trajectory (e.g., the end point 140A), the outer part of the corresponding pointer tip (e.g., 142A) is also sampled to obtain the raw envelope points for closing the end of the ink trajectory (e.g., points 150C, 150D and 150E).

Figure 8C:
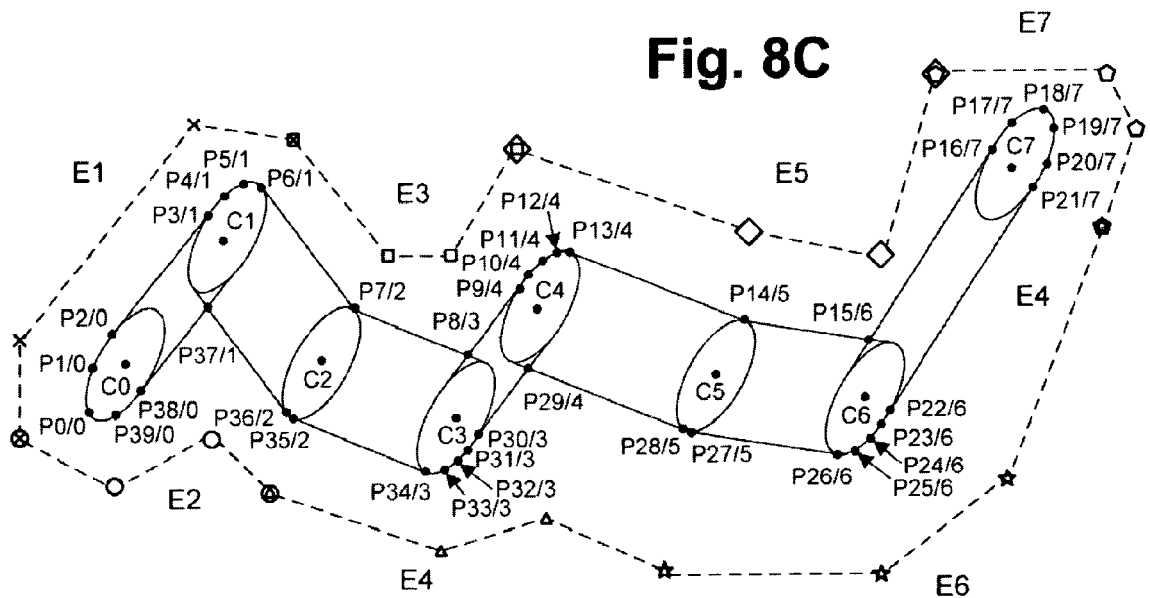

The generated raw envelope points are indexed. As shown in FIG. 8C, each raw envelope point is associated with two index numbers: a natural index number, denoted as Pn, where n=0, 1, 2, . . . , and the index number of the nearest sampled contact point of the normalized ink trajectory. For example, in FIG. 8C, there are five raw envelope points P3, P4, P5, P6 and P37 near the sampled contact point C1 of the ink trajectory. Therefore, these raw envelope points are also associated with the index of the sampled contact point C1, and are denoted as P3/1, P4/1, P5/1, P6/1 and P37/1, where the number before "/" represents the natural index and the number after "/" represents the index of the nearest sampled contact point of the normalized ink trajectory. Note that the natural index of the raw envelope points may be in any convenient order, and the order shown in FIG. 8C is for illustrative purposes only.

Referring again to FIG. 4, following raw envelope point generation at step 106, the obtained raw envelope points are curve-fitted at step 108 to generate a smoothed ink envelope and hence a resultant smooth outline of the calligraphic ink object. Each set of successive raw outer envelope points are piecewise curve-fitted. Each set of successive raw inner envelope points between two break-points are also piecewise curve-fitted. Each pair of successive break-points are connected by a straight line. Thus, the smoothed outline of the calligraphic ink object is described by a set of curve functions, each determined by a set of calculated parameters, as well as the straight line functions connecting successive break-points. In this embodiment, the smoothed outline of the calligraphic ink object is described by a set of Bezier functions, each determined by four control points, as well as the straight line functions connecting successive break-points.

As an example, FIG. 8C shows the control points of seven resulting fitting curves E1, E2, . . . , E7. In this figure, the control points of the resulting curves are moved outward for the purpose of clear illustration. The actual resulting curves would be at the proximity of the raw envelope points. Also for the purpose of clear illustration, the fitting curves are not drawn in FIG. 8C, but, instead, the control points are connected by dashed lines.

Each of the resulting fitting curves fits to a number of raw envelope points. The curve-fitting technique will return the range of raw envelope points to which each resulting fitting-curve fits. For example, in FIG. 8C, the fitting curve E1 fits to the raw envelope points P0 to P6, and the fitting curve E3 fits to the raw envelope points P6 to P12. With this information, the sampled contact points of the normalized ink trajectory returned by the curve-fitting technique are indexed.

Figure 8D:
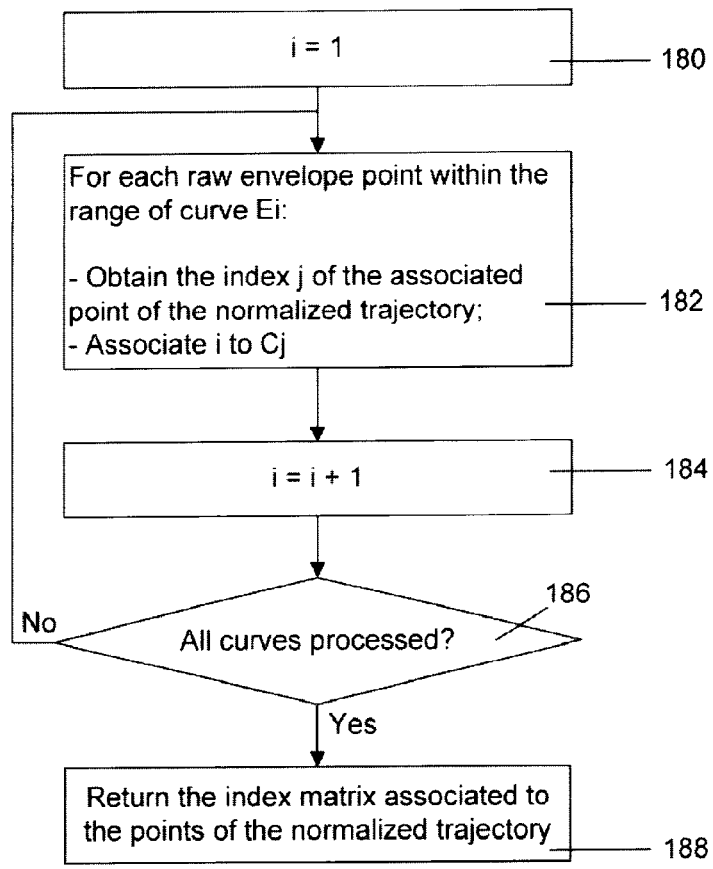
FIG. 8D is a flowchart showing the steps performed during indexing of points along the normalized ink trajectory.

FIG. 8D shows the steps performed during indexing of the sampled contact points of the normalized ink trajectory. First, a counter i is initialized to one (1) (step 180) and the first fitting curve E1 is selected. At step 182, each raw envelope point to which the fitting curve E1 fits, is checked to obtain the index of the associated sampled contact point of the normalized ink trajectory. For example, in FIG. 8C, raw envelope points P0 to P6 to which the fitting curve E1 fits are checked. Seen from the second part of their denotation (i.e., the number after the slash "/"), raw envelope points P0, P1 and P2 are associated with sampled contact point C0. The sampled contact point C0 is assigned an index 1 to indicate that the sampled contact point C0 is associated with fitting curve E1 and the assigned index is added to an index matrix.

Thereafter, the counter i is increased by 1 (step 184), and a check is made to determine whether all fitting curves have been processed (step 186). If not, the process reverts to step 182 to check the next fitting curve, in the case fitting curve E2. Otherwise, the generated index matrix is returned (step 188).

At step 182 for fitting curve E2, raw envelope points P39 and P38 fit to the fitting curve E2 and are associated with the sampled contact point C0. As a result, the sampled contact point C0 is also assigned the index 2 to indicate that the sampled contact point C0 is associated with the fitting curve E2 and the assigned index is added to the index matrix. As will be appreciated, after the raw envelope points to which each fitting curve fits have been checked, the resultant index matrix includes one or more indices for each sampled contact point identifying each fitting curve that is associated with each sampled contact point. For example with reference again to FIG. 8C, sampled contact point C1 is assigned indices 1 and 2 and optionally index 3 (because raw envelope point P6 fits to both fitting curve E1 and fitting curve E3). Sampled contact point C2 is assigned indices 3 and 2 and optionally index 4. When a raw envelope point fits to multiple fitting curves, the raw envelope point can be assigned to a selected fitting curve or to both fitting curves.

Once the index matrix has been completed at step 188, the obtained fitting curve functions and the corresponding control points, as well as the sampled contact points of the normalized ink trajectory and the index matrix are stored. This information provides a mathematic description of the calligraphic object outline. With the mathematic description of the calligraphic ink object outline obtained, the outline of the calligraphic ink object may be filled in with a user-selected color or texture by the processing structure 14 using a rendering program. Then, the calligraphic ink object may be drawn on the touch surface 24 as a vectorized image so that it can be arbitrarily zoomed while maintaining the smoothness of its outline. FIG. 8E shows an exemplary calligraphic ink object generated by the processing structure 14 using the above described method.

FIG. 9A shows the steps performed by the processing structure 14 during an alternative calligraphic ink object generating technique. This technique is suitable for generating calligraphic ink objects substantially in real-time and employs multi-thread/multi-core technology to calculate the smoothed ink outline segments of the calligraphic ink objects in parallel.

During this calligraphic ink object generating method, the sampled contact points of the user writing are segmented by time, i.e., starting from the first sampled contact point, the sampled contact points received by the processing structure 14 within every T milliseconds are grouped as a segment, where T is a predefined parameter. The value of the parameter T is selected from a range typically determined by the user based on writing experience and/or the processing structure performance. At step 200, the processing structure 14 receives the sampled contact points of a segment of the input ink object. At step 202, if the segment is not the first segment of the input ink object, the last sampled contact point of the previous segment is prefixed to the current segment and a storage pointer to these sampled contact points is placed into a segment heap. The ink object segment is then assigned to a background thread for generating the smoothed ink outline of the calligraphic ink object segment.

The background thread processes the ink object segment using a similar method as described with reference to FIG. 4 but with a slight modification. In particular, during this method if the ink object segment is the first segment of the input ink object, the outer part of the pointer tip instance centered at the first sampled contact point of the normalized ink trajectory is sampled to obtain raw envelope points for closing the first end of the calligraphic ink object. The envelope around the last sampled contact point of the calligraphic ink object segment is left open. If the ink object segment is not the first segment of the input ink object, then both ends of the envelope are left open.

FIG. 9B shows two exemplary segments S1 and S2 of an input ink object. The raw envelope points are also marked in FIG. 9B as dots. Because calligraphic ink object segment S1 is the first segment of the input calligraphic ink object, the outer part of the first pointer tip instance 220 is sampled to obtain the raw envelope points 222 for closing the calligraphic ink object segment outline. On the other hand, because calligraphic ink object segment S2 is not the first segment of the input calligraphic ink object, both ends are left open.

Referring again to FIG. 9A, after sending the ink object segment to a background thread, the process checks at step 204 whether the user's writing is complete (e.g., by detecting whether a pen tool-up event occurs). If not, the process goes back to step 200 to collect another calligraphic ink object segment and send it to another background thread for processing. In this manner, calligraphic ink object outlines for different ink object segments are generated by different threads in parallel reducing the lag between the user writing the ink and written ink being displayed on the touch surface 24.

At step 204, if it is detected that the user has completed writing (e.g., when the pen tool-up event is received), the last ink object segment is then sent to a background thread for processing (step 206). In the processing of the last ink object segment, the pointer tip instance centered at the last sampled contact point of the normalized ink trajectory is also sampled at its outer part to obtain raw envelope points for closing the calligraphic ink object outline.

Figure 9C:
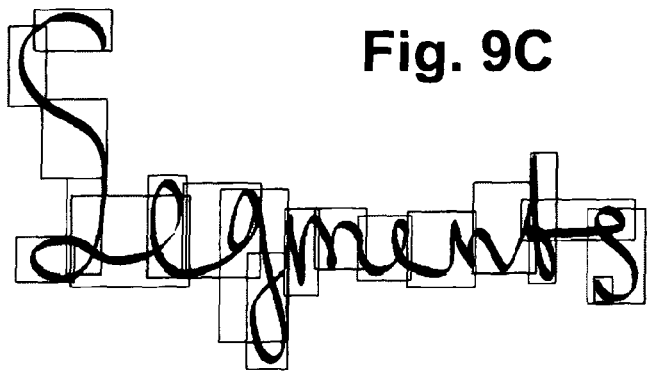
FIG. 9C shows another exemplary calligraphic ink object.

After all of the ink object segments have been processed, the calligraphic ink object segments are collected and smoothly connected together to form the final calligraphic ink object (step 208). FIG. 9C shows such an exemplary calligraphic ink object, where each calligraphic ink object segment is contained within a respective rectangular box.

The method of erasing calligraphic ink objects employed by the processing structure 14 when a user moves an eraser across the touch surface 24 along a path or trace that intersects a calligraphic ink object will now be described. In the following, for ease of discussion, the erasing method will be described with specific reference to a circle-shaped eraser.

However, those skilled in the art will appreciate that any other shape may be used as the eraser including, for example, an ellipse, triangle, rectangle, square, or other polygonal shape. The eraser may have a fixed size, or may be variable in size. When the eraser is variable size, the eraser size may be selected based on the magnitude of the pressure the user applies to the touch surface 24 using the eraser or on a user-selected size-varying scheme. Again for the ease of description, only the case where the trace of the eraser intersects the calligraphic ink object once will be discussed although those skilled in the art will appreciate that the method applies to cases where the trace of the eraser intersects the calligraphic ink object multiple times.

Figure 11A:
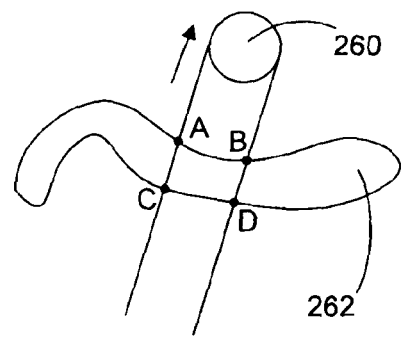
FIGS. 11A to 11D show an exemplary procedure of erasing a portion of a calligraphic ink object.
Figure 10:
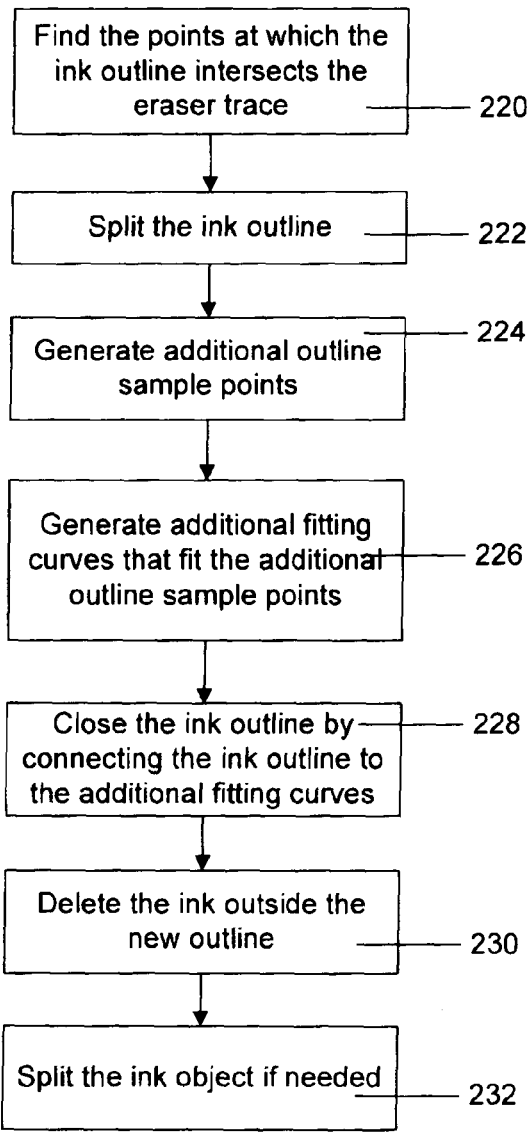
FIG. 10 a flowchart showing the steps performed during calligraphic ink object erasing.

FIG. 10 shows the steps performed by the processing structure 14 during erasing of a calligraphic ink object. At step 220, the processing structure 14 initially finds the four points on the calligraphic ink object outline where the trace of the eraser intersects the calligraphic ink object. For example, in FIG. 11A, the trace of the eraser 260 intersects the outline of the calligraphic ink object 262 at points A, B, C and D.

Figure 11B:
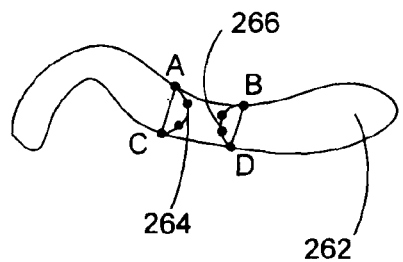
Figure 11C:
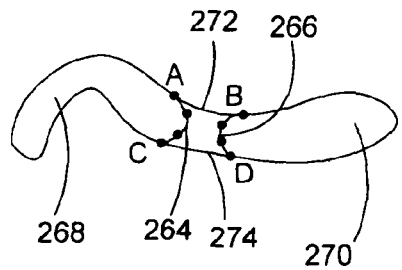

At step 222, the calligraphic ink object outline is split at intersection points A and B and at intersection points C and D. At step 224, additional outline points are generated between points A and C, and between points B and D, respectively. Then, an additional fitting curve is generated to fit the points A, C and the additional outline points therebetween (curve 264 in FIG. 11B). An additional fitting curve is also generated to fit the points B, D and the additional outline points therebetween (curve 266 in FIG. 11B). Then, the processing structure 14 closes the calligraphic ink object outline by connecting the outline to the additional fitting curves. For example, in FIG. 11C, the outline of the left part 268 of the calligraphic ink object is closed by connecting it to the curve 264, and the outline of the right part 270 of the calligraphic ink object is closed by connecting it to the curve 266.

Figure 11D:
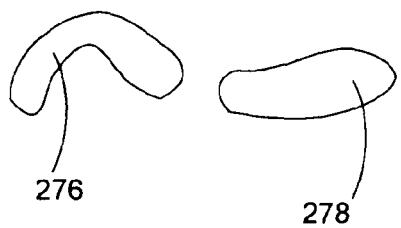

At step 230, the portion of the calligraphic ink object outline that is outside of the newly generated outline, e.g. the portion of the calligraphic ink object outline outside of the curves 264 and 266, is deleted. The newly generated calligraphic ink object outline may be filled in with a user-selected color or texture by the rendering program. The resulting calligraphic ink object outline is shown in FIG. 11D. Optionally, at step 232, the newly generated calligraphic ink object outline may be checked to see if all calligraphic ink object outline components of the calligraphic ink object are connected. If not, the calligraphic ink object can be split into separate calligraphic ink objects. The separate calligraphic ink objects may be automatically grouped together or may be separate. The decision to make them separate or automatically grouped may be based on the distance between the ends of the separate calligraphic ink objects. If the separate calligraphic ink objects are spaced by a distance greater than a threshold amount, then the calligraphic ink objects will be treated as separate ink objects; otherwise, they are automatically grouped.

Depending on the nature of the processing structure employed, this erasing method may be slow because step 220 typically requires a large amount of calculation to find the intersection points. In certain instances, a fast erasing methodology may be employed as will now be described.

Figure 12A:
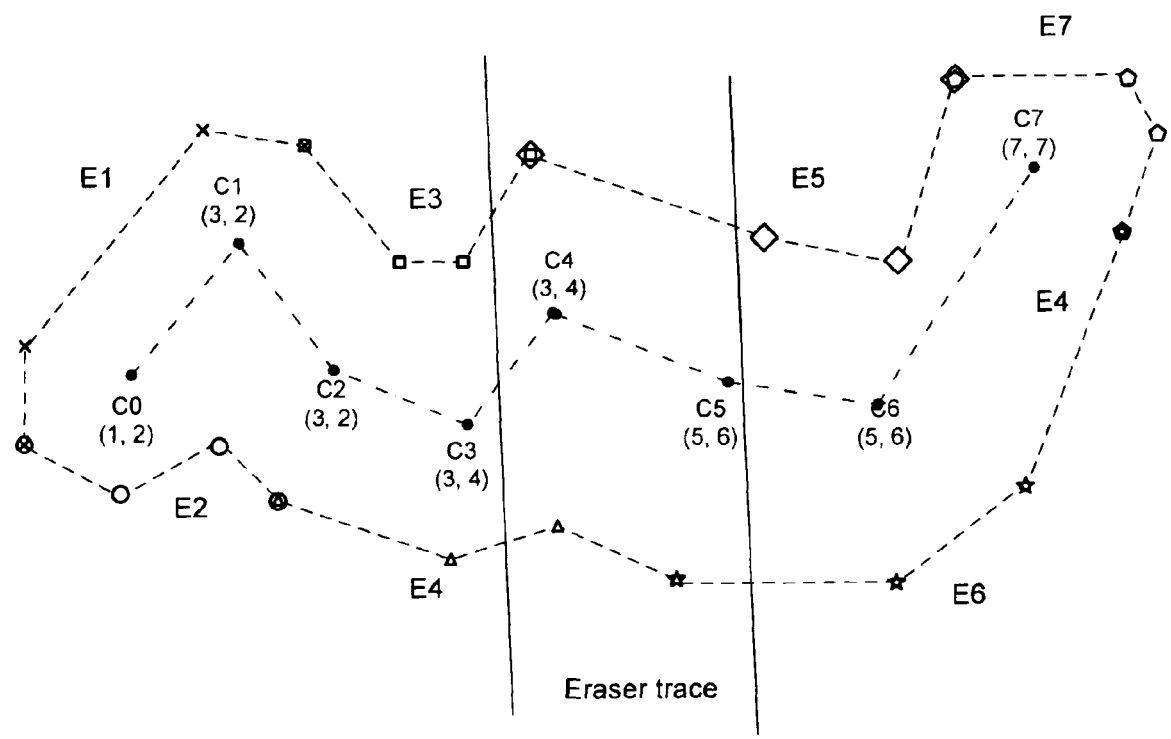
FIGS. 12A to 12D show another exemplary procedure of erasing a portion of a calligraphic ink object.

The fast erasing methodology generally follows the same steps as shown in FIG. 10. However, at step 220, the fast erasing methodology does not directly determine the intersection points of the calligraphy ink object outline and the eraser trace. Instead, the fast erasing methodology first finds the intersection points of the normalized ink trajectory and the eraser trace. Referring to FIG. 12A, each sampled contact point of the normalized ink trajectory is associated with an index matrix, which is a pair of indices (x,y) in this figure, where x refers to the index of the fitting curve above the normalized ink trajectory, and y refers the index of the fitting curve below the normalized ink trajectory. These indices are obtained when the calligraphic ink object is generated as previously described.

The processing structure 14 first searches the sampled contact points of the normalized ink trajectory to find a sampled contact point within the eraser trace and nearest to the left edge of the eraser trace, which is, in the case shown in FIG. 12A, contact point C4. The processing structure 14 also searches the sampled contact points of the normalized ink trajectory to find a sampled contact point within the eraser trace and nearest to the right edge of the eraser trace, which is, in the case shown in FIG. 12A, contact point C5. In an alternative implementation, the actual intersection points of the normalized ink trajectory and the calligraphic ink object outline may be found (which are interpolated points between contact points C3 and C4, and contact points C5 and C6, respectively). The index of each actual intersection point may be copied from its nearest sampled contact point of the normalized ink trajectory.

After the intersection contact points C4 and C5 are found, their indices are checked to find the corresponding fitting curve on the calligraphic ink object outline. The indices of intersection contact point C4 are (3, 4), which correspond to fitting curve E3 above and fitting curve E4 below. Similarly, the indices of intersection contact point C5 are (5, 6), which correspond to fitting curve E5 above and fitting curve E6 below.

Figure 12B:
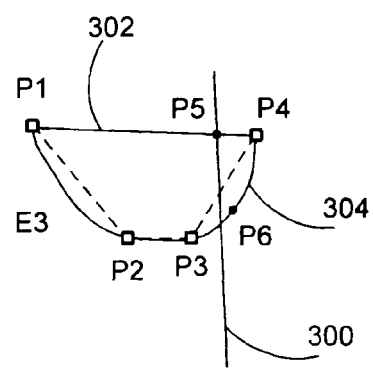

Then, for each identified fitting curve, a split point is calculated. FIG. 12B illustrates how the split point is calculated for the fitting curve E3 (numeral 304). In FIG. 12B, the four control points of the Bezier fitting curve 304 are marked as P1, P2, P3 and P4, where P1 and P4 are the two end points. Line 300 represents the left edge of the eraser trace.

The processing structure 14 first calculates a line segment 302 between the two end control points P1 and P4. Then, the intersection point P5 of the line segments 300 and 302 is calculated. A split ratio t is calculated as:

$$t = |P1P5|/|P1P4|$$

where:
|P1P5| is the length of the line segment between control points P1 and P5; and
|P1P4| is the length of the line segment between control points P1 and P4.

The split point P6 on the fitting curve 304 is then calculated such that the ratio of the length of the curve P1P6 over that of the curve P1P6P4 is equal to t. In this embodiment, the BezierSplit function described in above-incorporated publication entitled "An Algorithm for Automatically Fitting Digitized Curves" authored by Philip J. Schneider, Graphics Gems, Academic Press Professional, Inc. (1990) is used as expressed by:
BezierSplit(OriginalControlPoints, ResultingLeftCurve, ResultingRightCurve, t)
where:
OriginalControlPoints are the coordinates of the original control points (input parameter);
ResultingLeftCurve is the resulting fitting curve on the left side of the split point (output parameter);
ResultingRightCurve is the resulting fitting curve on the right side of the split point (output parameter); and
t is the split ratio.

Thus, the BezierSplit function not only splits the fitting curve 304, but also generates a new fitting curve (ResultingLeftCurve) between control points P1 and P6, and another fitting curve (ResultingRightCurve) between control points P6 and P4.

Figure 12C:
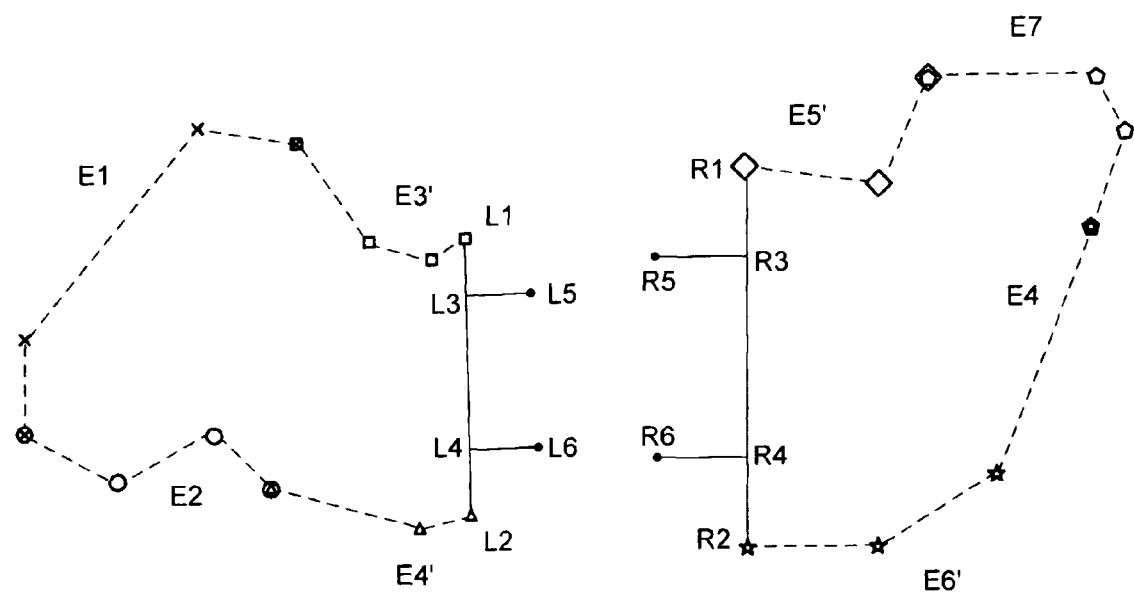

For each fitting curve to be split, the BezierSplit function is called. For the fitting curve on the left side of the eraser trace, the ResultingLeftCurve is kept, and the ResultingRightCurve and the original fitting curve to be split are dropped. For the fitting curve on the right side of the eraser trace, the ResultingRightCurve is kept, and the ResultingLeftCurve and the original fitting curve to be split are dropped. FIG. 12C shows the new calligraphic ink object outline after splitting, where E3', E4', E5' and E6' are the new fitting curves generated by the BezierSplit function, which are kept for using as the modified outline fitting curves.

The next step of the fast erasing methodology is to generate additional outline points (corresponding to step 224 in FIG. 10). Referring to FIG. 12C, for the left part of the calligraphic ink object outline, a line segment between the two split points L1 and L2 is calculated. Along this line segment, a point L3 is calculated such that |L1L3|=|L1L2|/4. Similarly, a point L4 on the line segment L1L2 is also calculated such that |L4L2|=|L1L2|/4. Then, a point L5 is calculated such that the line segment L3L5 generally perpendicularly extends from point L3 towards the center of the eraser trace and has a length of |L1L3|. Similarly, a point L6 is calculated such that the line segment L4L6 generally perpendicularly extends from point L4 towards the center of the eraser trace and has a length of |L4L2|. An additional fitting curve $E_L$ is obtained by using the points L1, L5, L6 and L2 as the control points to close the left part of the calligraphic ink object outline.

The above procedure generates two additional points so that these two points, together with the two end points L1 and L2 of the split outline, can be directly used as the four control points to obtain the additional fitting curve $E_L$. However, those skilled in the art will appreciate that a different number of additional points may also be generated at different positions for generating the additional fitting curve. The actual number of additional points and the positions they are located may depend on the fitting curve used or may be arbitrary.

Two additional points R5 and R6 are also calculated for the right side of the calligraphic ink object outline in a similar manner. An additional fitting curve $E_R$ is then obtained by using the points R1, R5, R6 and R2 as the control points to close the right part of the calligraphic ink object outline.

Figure 12D:
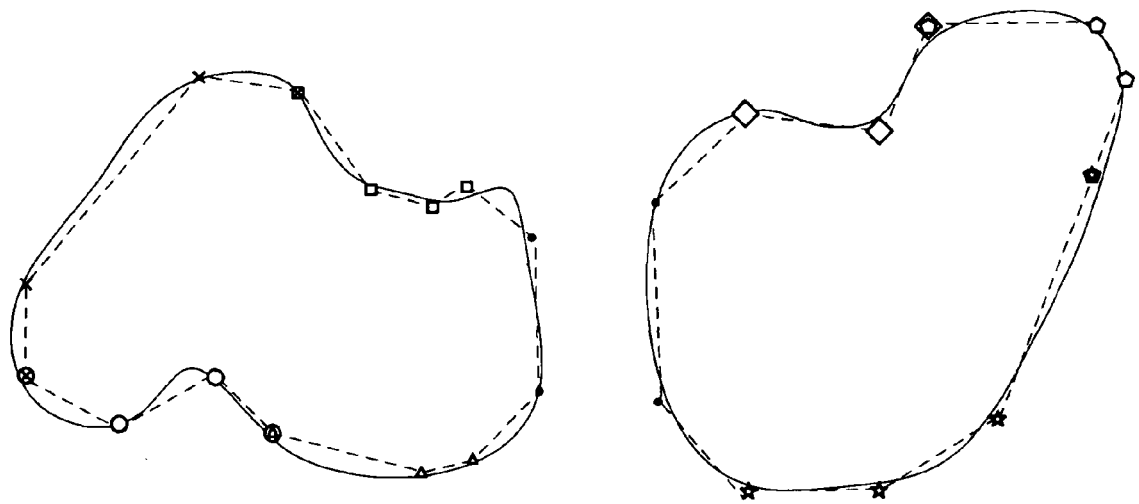

The rest of the fast erasing methodology is similar to steps 230 and 232 in FIG. 10. In this embodiment, each unconnected portion of the calligraphic ink object after erasing is copied to a new calligraphic ink object. In the example shown in FIGS. 12A to 12D, the calligraphic ink object becomes two unconnected parts after erasing. Therefore, each part is copied to a separate calligraphic ink object. The original calligraphic ink object is deleted after copying each unconnected portion of the calligraphic ink object to a new calligraphic ink object. FIG. 12D shows the calligraphic ink object outlines (two ink objects) after erasing.

Those skilled in the art will appreciate that the calligraphic ink generation and erasing methodologies described above that are performed by the processing structure are exemplary. Other variations and modifications are available. For example, although an elliptical shape is used as the pointer tip in the above embodiments, those skilled in the art will appreciate that other pointer tip shapes may be used, including, rectangular, square and other polygon shapes. The pointer tip may have a fixed size, or may be size-variable based on for example the pressure the user applies to the touch surface using the pointer or according to another user-selected size-varying scheme.

If a machine vision-based touch panel is employed rather than an analog resistive touch panel, the brush type may be determined from an image of the pointer tip contacting the touch surface 24 captured by the coordinate input device 12. In this case, each sampled contact point obtained at step 80 is derived from a captured pointer tip image. The centroids of the captured pointer tip images form the trajectory of the ink object.

Although embodiments have been described with reference to the drawings, those of skill in the art will appreciate that other variations and modifications from those described may be made without departing from the spirit and scope of the invention, as defined by the appended claims.

What is claimed is:

1. A method of generating a calligraphic ink object, comprising:
    sampling contact coordinates generated by a coordinate input device during writing thereon using a pointer having a tip to generate an ink trajectory generally representing the writing;
    surrounding each sampled contact coordinate along the generated ink trajectory with a pointer tip instance, and for each consecutive pair of sampled contact coordinates, generating inner and outer line segments on opposite sides of a line segment joining the sampled contact coordinates of the pair, that extend between and are tangential to the peripheries of the pointer tip instances surrounding the sampled contact coordinates of the pair;
    generating an ink envelope between three successive contact coordinates, the ink envelope comprising an outer envelope formed by the outer line segments and an inner envelope formed by the inner line segments, wherein only the outer envelope includes envelope points on the pointer tip instance of a middle one of the three successive contact coordinates when the inner line segments intersect, and wherein the inner envelope includes an intersection point of the inner line segments as an envelope point in lieu of envelope point on the pointer tip instance of the middle one of the three successive contact coordinates;
    generating a smoothed ink envelope at least by fitting curves to points on said ink envelope; and
    drawing the smoothed ink envelope on a display surface thereby to generate the calligraphic ink object.

2. The method of claim 1 wherein said sampling contact coordinates further comprises processing the sampled contact coordinates to reduce the number of sampled contact coordinates used to generate the ink trajectory.

3. The method of claim 2 wherein said processing comprises discarding selected sampled contact coordinates.

4. The method of claim 3 wherein the discarded selected sampled contact coordinates are co-linear with other sampled contact coordinates.

5. The method of claim 4 wherein said processing comprises determining line segments that join consecutive pairs of sampled contact coordinates having the same slope and discarding sampled contact coordinates at intermediate locations along the length of the line segments.

6. The method of claim 1 wherein the ink envelope generating is performed upon completion of writing.

7. The method of claim 6 wherein completion of writing is signaled by a pointer up event.

8. The method of claim 6 wherein said ink envelope generally completely surrounds said ink trajectory.

9. The method of claim 6 wherein said smoothed ink envelope comprises curved and straight lined segments.

10. The method of claim 1 wherein the points on said ink envelope to which the curves are fitted are positioned along the peripheries of each pointer tip instance.

11. The method of claim 1 wherein each pointer tip instance has a geometrical shape.

12. The method of claim 11 wherein the geometrical shape is one of circular, elliptical, triangular, rectangular, ovate and polygonal.

13. The method of claim 1 wherein generating the smoothed ink envelope comprises fitting Bezier curves to points on said ink envelope.

14. The method of claim 1 wherein said ink trajectory comprises ink trajectory segments, wherein an ink envelope segment is generated for each ink trajectory segment and wherein the ink envelope segments are combined to form said ink envelope.

15. The method of claim 14 wherein said ink envelope generally completely surround the ink trajectory.

16. The method of claim 14 wherein each ink trajectory segment is represented by a subset of sampled contact coordinates.

17. The method of claim 16 wherein each ink trajectory segment is represented by sampled contact coordinates generated by said coordinate input device over a threshold period of time.

18. The method of claim 14 wherein said ink envelope generating comprises for each ink trajectory segment surrounding each sampled contact coordinate along the ink trajectory segment with a pointer tip instance and for each consecutive pair of sampled contact coordinates, generating line segments on opposite sides of a line segment joining the sampled contact coordinates of the pair, that extend between and are tangential to the peripheries of the pointer tip instances surrounding the sampled contact coordinates of the pair.

19. The method of claim 18 wherein the points on said ink envelope to which the curves are fitted are positioned along the peripheries of each pointer tip instance.

20. The method of claim 18 wherein each pointer tip instance has a geometrical shape.

21. The method of claim 20 wherein the geometrical shape is one of circular, elliptical, triangular, rectangular, ovate and polygonal.

22. The method of claim 18 wherein generating a smoothed ink envelope comprises fitting Bezier curves to points on said ink envelope.

23. The method of claim 1 wherein said drawing comprises drawing the smoothed ink envelope as a vectorized image.

24. The method of claim 23 further comprising coloring and/or shading the smoothed ink envelope prior to said drawing.

25. A method of generating a calligraphic ink object comprising:
   generating an ink trajectory representing writing input on a display surface of a coordinate input device using an object in the form of a pen tool having a tip at one end thereof, the ink trajectory comprising a subset of contact coordinates generated by the coordinate input device;
   generating an ink envelope surrounding the ink trajectory, the ink envelope being represented by curved and straight inner and outer line segments that join tangent points on pen tool tip instances at the contact coordinates, wherein the ink envelope between three successive contact coordinates comprises an outer envelope formed by the outer line segments and an inner envelope formed by the inner line segments, and only the outer envelope includes envelope points on the pen tool tip instance of a middle one of the three successive contact coordinates when the inner line segments intersect, and wherein the inner envelope includes an intersection point of the inner line segments as an envelope point in lieu of envelope point on the pointer tip instance of the middle one of the three successive contact coordinates; and
   drawing the ink envelope on the display surface thereby to generate the calligraphic ink object.

26. The method of claim 25 wherein the curved line segments are Bezier curves.

27. The method of claim 25 wherein said ink envelope comprises a plurality of joined ink envelope segments, each ink envelope segment being associated with a respective ink trajectory segment.

28. The method of claim 25 wherein the shape of the pen tool tip is one of circular, elliptical, triangular, rectangular, ovate and polygonal.

29. The method of claim 25 wherein said drawing comprises drawing the smoothed ink envelope as a vectorized image.

30. The method of claim 29 further comprising coloring and/or shading the smoothed ink envelope prior to said drawing.

31. An apparatus comprising:
   at least one processor; and
   memory storing a calligraphic ink object generating routine, the calligraphic ink object generating routine, when executed by the at least one processor, causing the apparatus to:
     sample contact coordinates generated by a coordinate input device during writing thereon using a pointer having a tip to generate an ink trajectory generally representing the writing;
     surround each sampled contact coordinate along the generated ink trajectory with a pointer tip instance, and for each consecutive pair of sampled contact coordinates, generate inner and outer line segments on opposite sides of a line segment joining the sampled contact coordinates of the pair, that extend between and are tangential to the peripheries of the pointer tip instances surrounding the sampled contact coordinates of the pair;
     generate an ink envelope between three successive contact coordinates, the ink envelope comprising an outer envelope formed by the outer line segments and an inner envelope formed by the inner line segments, wherein only the outer envelope includes envelope points on the pointer tip instance of a middle one of the three successive contact coordinates when the inner line segments intersect, and wherein the inner envelope includes an intersection point of the inner line segments as an envelope point in lieu of envelope point on the pointer tip instance of the middle one of the three successive contact coordinates;
     generate a smoothed ink envelope at least by fitting curves to points on said ink envelope; and
     draw the smoothed ink envelope on a display thereby to generate the calligraphic ink object.

32. An apparatus comprising:
   at least one processor; and
   memory storing a calligraphic ink object generating routine, the calligraphic ink object generating routine, when executed by the at least one processor, causing the apparatus to:

generate an ink trajectory representing writing input on a display surface of a coordinate input device using an object in the form of a pen tool having a tip at one end thereof, the ink trajectory comprising a subset of contact coordinates generated by the coordinate input device;

generate an ink envelope surrounding the ink trajectory, the ink envelope being represented by curved and straight inner and outer line segments that join tangent points on pen tool tip instances at the contact coordinates, wherein the ink envelope between three successive contact coordinates comprises an outer envelope formed by the outer line segments and an inner envelope formed by the inner line segments, and only the outer envelope includes envelope points on the pen tool tip instance of a middle one of the three successive contact coordinates when the inner line segments intersect, and wherein the inner envelope includes an intersection point of the inner line segments as an envelope point in lieu of envelope point on the pointer tip instance of the middle one of the three successive contact coordinates; and draw the ink envelope on a display thereby to generate the calligraphic ink object.

33. A non-transitory computer readable medium embodying computer program code, which when executed by at least one processor, causes an apparatus to:

sample contact coordinates generated by a coordinate input device during writing thereon using a pointer having a tip to generate an ink trajectory generally representing the writing;

surround each sampled contact coordinate along the generated ink trajectory with a pointer tip instance, and for each consecutive pair of sampled contact coordinates, generate inner and outer line segments on opposite sides of a line segment joining the sampled contact coordinates of the pair, that extend between and are tangential to the peripheries of the pointer tip instances surrounding the sampled contact coordinates of the generate an ink envelope between three successive contact coordinates, the ink envelope comprising an outer envelope formed by the outer line segments and an inner envelope formed by the inner line segments, wherein only the outer envelope includes envelope points on the pointer tip instance of a middle one of the three successive contact coordinates when the inner line segments intersect, and wherein the inner envelope includes an intersection point of the inner line segments as an envelope point in lieu of envelope point on the pointer tip instance of the middle one of the three successive contact coordinates;

generate a smoothed ink envelope at least by fitting curves to points on said ink envelope; and draw the smoothed ink envelope on a display thereby to generate the calligraphic ink object.

34. A non-transitory computer readable medium embodying computer program code, which when executed by at least one processor, causes an apparatus to:

generate an ink trajectory representing writing input on a display surface of a coordinate input device using an object in the form of a pen tool having a tip at one end thereof, the ink trajectory comprising a subset of contact coordinates generated by the coordinate input device;

generate an ink envelope surrounding the ink trajectory, the ink envelope being represented by curved and straight inner and outer line segments that join tangent points on pen tool tip instances at the contact coordinates, wherein the ink envelope between three successive contact coordinates comprises an outer envelope formed by the outer line segments and an inner envelope formed b the inner line segments, and only the outer envelope includes envelope points on the pen tool tip instance of a middle one of the three successive contact coordinates when the inner line segments intersect, and wherein the inner envelope includes an intersection point of the inner line segments as an envelope point in lieu of envelope point on the pointer tip instance of the middle one of the three successive contact coordinates; and draw the ink envelope on a display thereby to generate the calligraphic ink object.

* * * * *